United States Patent
Campbell et al.

(10) Patent No.: US 11,644,373 B2
(45) Date of Patent: May 9, 2023

(54) PIEZOELECTRIC STRAIN SENSOR UNIT FOR A ROLLING BEARING

(71) Applicant: Aktiebolaget SKF, Gothenburg (SE)

(72) Inventors: Andrew Campbell, East Kilbride (GB); Hans Soetens, Hilvarenbeek (NL); Allan Thomson, Lanark (GB)

(73) Assignee: Aktiebolaget SKF, Gothenburg (SE)

(*) Notice: Subject to any disclaimer, the term of this patent is extended or adjusted under 35 U.S.C. 154(b) by 100 days.

(21) Appl. No.: 17/241,280

(22) Filed: Apr. 27, 2021

(65) Prior Publication Data
US 2021/0364377 A1    Nov. 25, 2021

(30) Foreign Application Priority Data

May 25, 2020 (DE) .......................... 102020206480.6

(51) Int. Cl.
*G01L 5/167* (2020.01)
*G01L 1/16* (2006.01)
*G01L 5/22* (2006.01)

(52) U.S. Cl.
CPC ................ *G01L 5/167* (2013.01); *G01L 1/16* (2013.01); *G01L 5/228* (2013.01)

(58) Field of Classification Search
CPC ......... G01L 5/0019; G01L 5/167; G01L 1/16; G01L 5/228; F16C 19/522
See application file for complete search history.

(56) References Cited

U.S. PATENT DOCUMENTS 10,539,477 B2 * 1/2020 Erskine ................ G01M 13/04

FOREIGN PATENT DOCUMENTS

| CN | 2529231 Y | * | 1/2003 | |
|---|---|---|---|---|
| CN | 205280329 U | * | 6/2016 | |
| JP | 2018063113 A | * | 4/2018 | |
| JP | 2019056654 A | * | 4/2019 | |
| WO | WO-2014101983 A1 | * | 7/2014 | ............. F03D 17/00 |

* cited by examiner

*Primary Examiner* — Octavia Davis Hollington
(74) *Attorney, Agent, or Firm* — Garcia-Zamor Intellectual Property Law, LLC; Ruy Garcia-Zamor

(57) ABSTRACT

A piezoelectric strain sensor unit for a rolling bearing includes a piezoelectric strain sensor, and a sensor holder provided with a main body having a front face intended to be into contact with a component of the rolling bearing and a rear face, and with at least two flexible arms mounted on the main body and supporting opposite ends of the piezoelectric strain sensor, the piezoelectric strain sensor being axially located on the side of the rear face of the main body while remaining spaced apart from the rear face. The sensor holder is provided with a central pin which protrudes axially with regard to the front face of the main body and which is axially moveable with regard the main body, the central pin axially abutting onto the piezoelectric strain sensor.

20 Claims, 3 Drawing Sheets

PIEZOELECTRIC STRAIN SENSOR UNIT FOR A ROLLING BEARING

CROSS-REFERENCE TO RELATED APPLICATIONS

Figure 1:
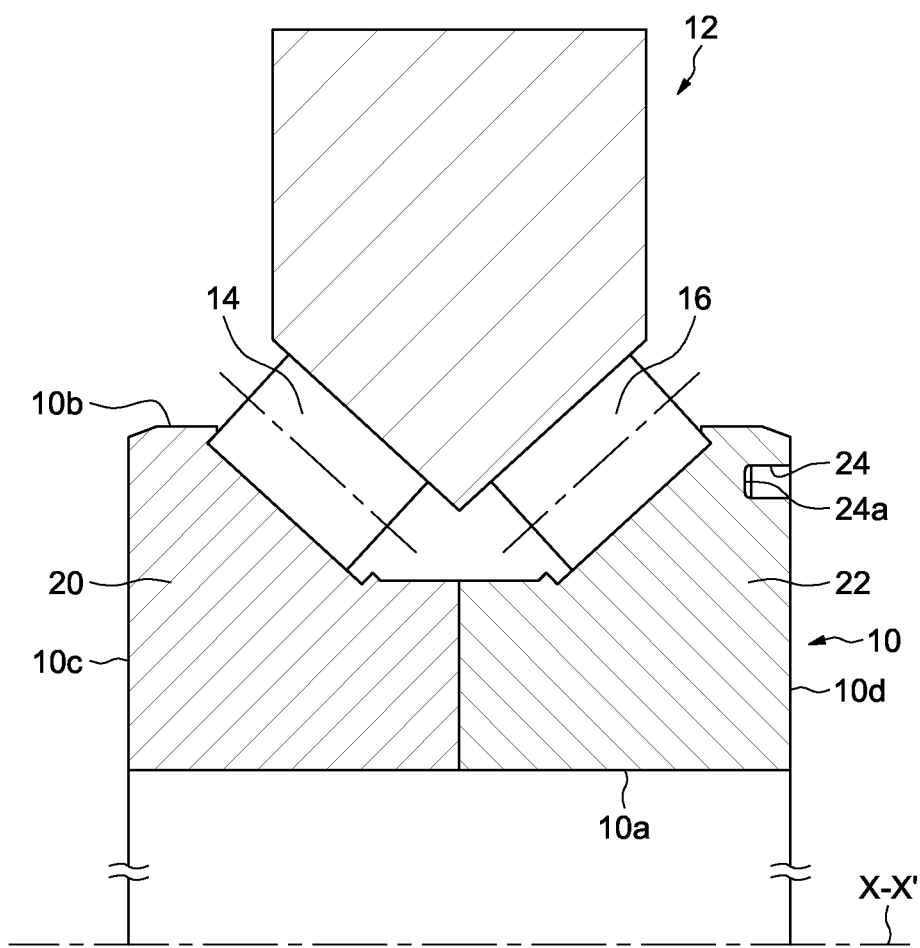

This application claims priority to German Patent Application no. 102020206480.6, filed May 25, 2020, the contents of which is fully incorporated herein by reference.

TECHNICAL FIELD

The present invention concerns condition monitoring of rolling bearings more particularly directed to rolling bearings with rollers, such as cylindrical rollers.

BACKGROUND OF THE INVENTION

A rolling bearing typically includes an inner ring, an outer ring and at least one row of rolling elements radially disposed between these two inner and outer rings. The rolling elements may be rollers or needles. The rolling bearing may be a spherical roller bearing (SRB), a tapered roller bearing (TRB), or a toroidal roller bearing (CARB). Alternatively, the rolling elements may be balls.

In the field of rolling element bearings, it is known to attach one or more sensors to measure one or more physical parameters and transduce these physical parameters into electrical signals. One such example is the use of a load or strain sensor in order to determine a load that rolling elements are subjected to in a loaded zone. This can be done to determine a load a machine is subjected to. Determining a load that a bearing is subjected to can also be done for the purpose of determining past and current operating conditions and predict future reliability.

Classically, such strain sensor is permanently bonded to the surface of rolling bearing being measured and cannot be replaced in service.

One aim of the present invention is to overcome this drawback.

SUMMARY OF THE INVENTION

The invention relates to a piezoelectric strain sensor unit for a rolling bearing having a piezoelectric strain sensor, and a sensor holder provided with a main body having a front face intended to be into contact with a component of the rolling bearing and a rear face, and with at least two flexible arms mounted on the main body and supporting opposite ends of the piezoelectric strain sensor. The piezoelectric strain sensor is axially located on the side of the rear face of the main body while remaining spaced apart from the rear face.

According to a general feature, the sensor holder is further provided with a central pin which protrudes axially with regard to the front face of the main body and which is axially moveable with regard the main body. The central pin axially abuts onto the piezoelectric strain sensor.

Thanks to the invention, the method to measure deformation is a three points bending measurement method. The piezoelectric strain sensor will bend in response to an axial movement of the central pin of the sensor holder, and give a signal which indicates a value for dynamic deformation.

Both ends of the piezoelectric strain sensor are flexible supported by the flexible arms of the sensor holder. This reduces the parasitic stress in the piezoelectric strain sensor, which give that forces introduced by temperature do not influence the measurement. This results in a very repeatable measurement. The flexible arms act as leaf springs.

Preferably, the front face of the main body is provided with at least three feet to position the sensor holder into contact with the component of the rolling bearing. This also contributes to a repeatable measurement.

Advantageously, the bending stiffness of the flexible arms of the sensor holder is smaller than the bending stiffness of the piezoelectric strain sensor. This leads to realize a big as possible measurement result.

Preferably, the central pin axially abuts in the middle of the piezoelectric strain sensor. The piezoelectric strain sensor may lie in a plane parallel to the front face of the main body.

In one embodiment, each flexible arm is provided with an axial part mounted on the main body and flexible in the radial direction, and with a radial part extending the axial part and flexible in the axial direction. The radial part of each flexible arm may extend from the axial part at an angle of 90 degrees.

In one embodiment, the main body, the flexible arms and the central pin of the sensor holder are made into one part. This makes the sensor holder unsensitive to temperature changes.

In one embodiment, the piezoelectric strain sensor unit further comprises an outer shell secured to the main body of the sensor holder and delimiting together with the main body a closed chamber inside which is located a pre-stressing element, the pre-stressing element exerting an axial force on the piezoelectric strain sensor so as to ensure an axial contact between the strain sensor and the central pin. The piezoelectric strain sensor unit may further comprise a connector sleeve connected to the outer shell and flexible bellows axially interposed between the connector sleeve and the outer shell.

The invention also relates to a rolling bearing comprising an inner ring, an outer ring and at least one row of rolling elements interposed between raceways of the inner and outer rings, one of the inner and outer rings comprising at least one piezoelectric strain sensor unit as previously defined. The main body of the sensor holder of the strain sensor unit comes into contact against a flat surface of the ring.

In one embodiment, the ring comprises at least one blind hole made into the thickness of the ring. The main body of the sensor holder of the strain sensor unit comes into contact against the flat bottom of the blind hole. The blind hole may extend from a radial side face or from an axial surface of the ring.

Alternatively, the main body of the sensor holder of the strain sensor unit may come into contact against one of the side faces of the ring.

DESCRIPTION OF THE ACCOMPANYING DRAWINGS

Figure 2:
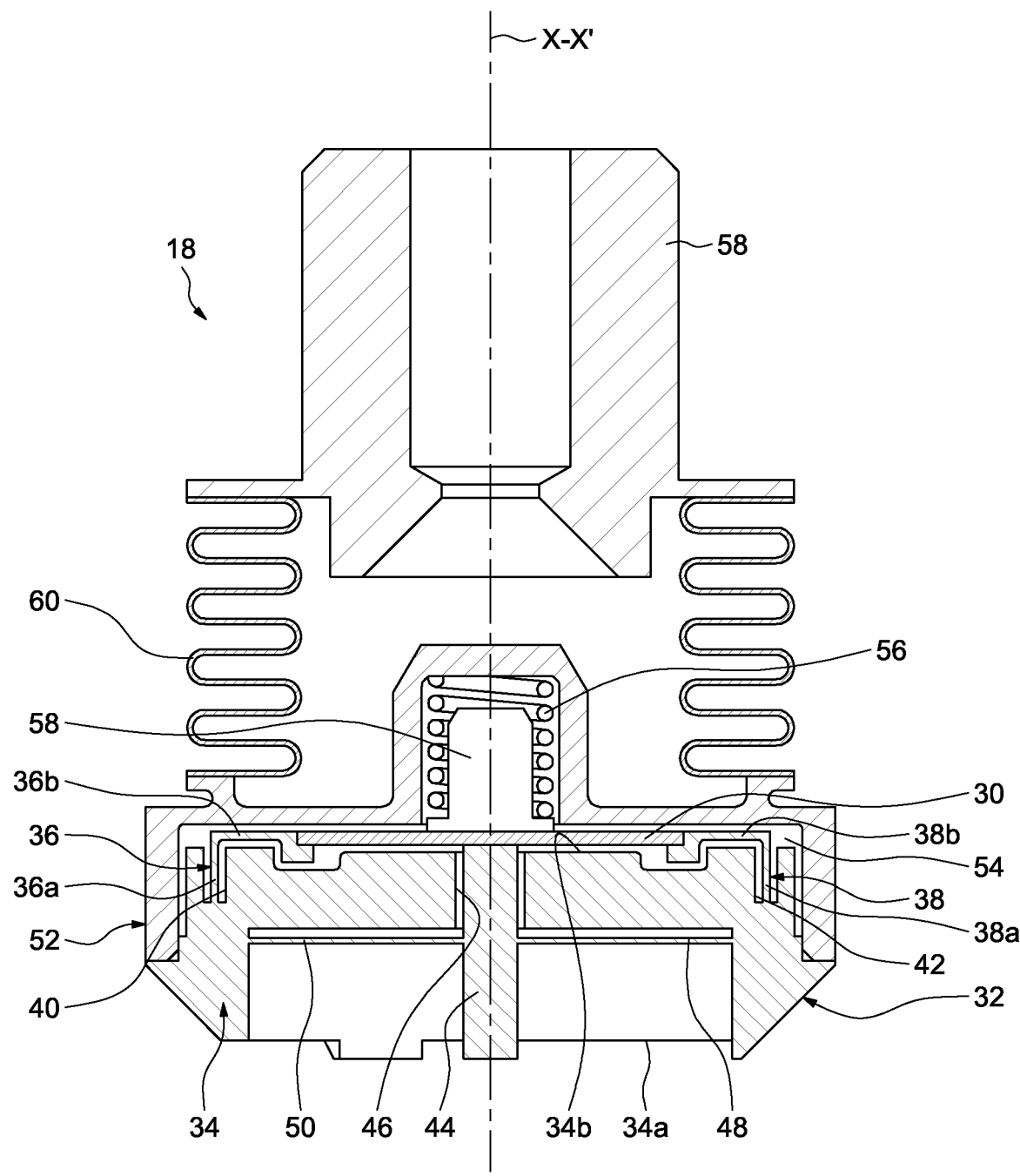
Figure 3:
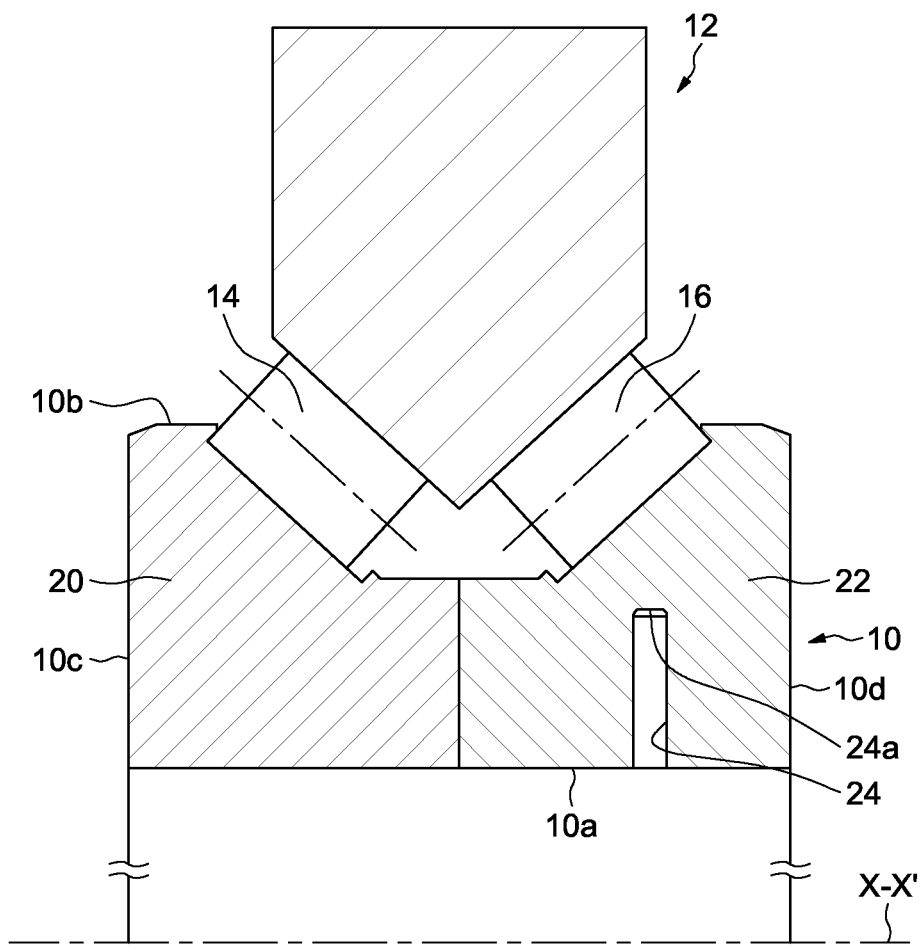

The present invention and its advantages will be better understood by studying the detailed description of specific embodiments given by way of non-limiting examples and illustrated by the appended drawings on which:

FIG. 1 is a cross-section of a rolling bearing according to a first example of the invention, FIG. 2 is a piezoelectric strain sensor unit of the rolling bearing of FIG. 1, and FIG. 3 is a cross-section of a rolling bearing according to a second example of the invention.

DETAILED DESCRIPTION OF THE INVENTION

The rolling bearing as illustrated on FIG. 1 comprising an inner ring 10, an outer ring 12, and two row of rolling elements 14 and 16, which are provided here in the form of rollers, mounted between the inner and outer rings.

As will be described later, in the illustrated example, the rolling bearing further is equipped with a piezoelectric strain sensor unit 18 (FIG. 2) mounted on the inner ring 10 to enable measuring load of the rolling elements 16.

The inner and outer rings 10, 12 are concentric and extend axially along the bearing rotation axis X-X' which runs in an axial direction. The rings 10, 12 are of the solid type.

The inner ring 10 is formed as a split ring and comprises a first part 20 and a second part 22 stacked one relative to the other in the axial direction. The inner ring 10 comprises a cylindrical bore 10a and an opposite outer cylindrical surface 10b from which annular raceways (not referenced) for the rolling elements 14, 16 are formed, the raceways being directed radially outwards.

The inner ring 10 further comprises two opposite radial side faces 10c, 10d which axially delimit the bore 10a and the outer surface 10b of the ring. The lateral faces 10c, 10d delimits the axial thickness of the inner ring 10. As previously mentioned, the inner ring 10 is divided in the axial direction in two separate parts, the first part 20 and the second part 22. The first part 20 delimits the lateral face 10c while the second part 22 delimits the lateral face 10d.

The inner ring 10 is provided with a blind hole 24 extending axially from the side face 10d. The blind hole 24 is oriented axially outwards. The blind hole 24 extends axially in the thickness of the inner ring 10. The blind hole 24 is provided with a flat bottom 24a. In the illustrated example, the bottom 24a extends radially.

As shown on FIG. 2, the piezoelectric strain sensor unit 18 comprises a piezoelectric strain sensor 30 and a sensor holder 32 supporting the strain sensor. The piezoelectric strain sensor unit 18 extends along a longitudinal axis X-X'.

The piezoelectric strain sensor 30 may be a piezoelectric plate or a piezoelectric beam.

The sensor holder 32 comprises a main body 34 having a front face 34a mounted into contact with the bottom 24a (FIG. 1) of the blind hole of the inner ring, and an opposite rear face 34b. The main body 34 is delimited by the front and rear faces 34a, 34b in the axial direction with respect to the longitudinal axis X-X'. The front and rear faces 34a, 34b extend radially. In the illustrated example, the front face 34a is provided with three feet (not referenced) to accommodate the hole bottom imperfections.

The sensor holder 32 also comprises two opposite flexible arms 36, 38 mounted on the main body 34 and supporting opposite ends of the piezoelectric strain sensor 30. In this example, each arm 36, 38 extends from the main body 34. The piezoelectric strain sensor 30 is supported by the arms 36, 38 above the rear face 34b of the main body. There is no contact between the piezoelectric strain sensor 30 and the rear face 34b. Thus, the piezoelectric strain sensor 30 remains spaced apart from the rear face 34b. The piezoelectric strain sensor 30 is secured to the arms 36, 38 by any appropriate means, for example by gluing, clamping, etc. The piezoelectric strain sensor 30 lies in a plane parallel to the front face 34a of the main body.

Preferably, the arms 36, 38 are designed such that their bending stiffness is smaller than the bending stiffness of the piezoelectric strain sensor 30. The arms 36, 38 are symmetric with regard to a median plane containing the longitudinal axis X-X'. In the disclosed example, each arm 36, 38 is provided with an axial part 36a, 38a mounted on the main body 34 and flexible in the radial direction, and with a radial part 36b, 38b extending the axial part 36a, 38a and flexible in the axial direction.

The axial part 36a, 38a of each arm extends from the main body 34. In the disclosed example, the main body 34 is provided with two blind holes 40, 42 extending axially from the rear face 34b. The axial part 36a, respectively 38a, extends from the bottom of the blind hole 40, respectively 42. The axial part 36a, 38a of each arm remains spaced apart from the peripheral wall of the associated blind hole 40, 42. Each axial part 36a, 38a axially protrudes with respect to the rear face 34b of the main body.

The radial part 36b, 38b of each arm extends from the upper end of the axial part 36a, 38a. Each radial part 36b, 38b is axially located above the rear face 34b of the main body. Each radial part 36b, 38b remains spaced axially apart from the rear face 34b.

The sensor holder 32 is further provided with a central pin 44 which protrudes axially with regard to the front face 34a of the main body in a free state. For example, the central pin 44 protrudes axially 0.1 mm lower than feet of the front face 34. The lower end of the central pin 44 comes into contact with the bottom 24a (FIG. 1) of the blind hole of the inner ring.

The pin 44 also protrudes axially with regard to the rear face 34b of the main body. The pin 44 axially abuts onto the piezoelectric strain sensor 30. The upper end of the pin 44 abuts in the middle of the piezoelectric strain sensor 30. The pin 44 extends axially inside a through-hole 46 made in the thickness of the main body 34.

In the illustrated example, the pin 44 and the main body 34 are made in one part. Two opposite flexible radial arms 48, 50 are here provided between the pin 44 and the bore of the main body 34. The pin 44 is axially moveable with respect to the main body 34.

In the disclosed example, the main body 34, the arms 36, 38 and the pin 44 of the sensor holder are made in one part. Alternatively, the sensor holder could be built up out of multiple parts.

The piezoelectric strain sensor unit 18 also comprises an outer shell 52 secured to the main body 34 of the sensor holder and delimiting together with the main body a closed chamber 54 inside which are located the arms 36, 38 and the piezoelectric strain sensor 30. The outer shell 52 recovers the main body 34. The outer shell 52 is secured to the main body 34 by any appropriate means.

The piezoelectric strain sensor unit 18 further comprises an elastic compressing spring 56 exerting an axial pre-stressing permanent force on the piezoelectric strain sensor 30 so as to ensure an axial contact between the sensor and the pin 44 and allowing for any dip at centre of the bottom 24a (FIG. 1) of the blind hole of the inner ring. The spring 56 is mounted inside the chamber 54 defined between the outer shell 52 and main body 34.

In the disclosed example, the piezoelectric strain sensor unit 18 comprises a central stud 58 to center the spring 56 on the piezoelectric strain sensor 30. The stud 58 is secured to the piezoelectric strain sensor 30. The spring 56 is mounted around the stud 58. A first end of the spring 56 axially abuts against the outer shell 52, and a second end axially abuts against the stud 58. The spring 56 forms a pre-stressing element. Alternatively, it could be possible to provide other pre-stressing element to exert a permanent axial force on the piezoelectric strain sensor 30, for example elastic washers such as Belleville washers.

The strain sensor unit 18 further comprises a connector sleeve 58 intended to be fixed to the inner ring 10 (FIG. 1), and flexible bellows 60 axially interposed between the sleeve and the outer shell 52. Bellows 60 are secured to the sleeve 58 and to the outer shell 52. Through the bellows 60, the sensor holder 32 is always correctly aligned with the bottom 24a (FIG. 1) of the blind hole of the inner ring.

In use, the central pin 44 of the sensor holder is pushed up with regard to the axis X-X' as the bottom 24a (FIG. 1) of the hole of the inner ring deforms in response to increased load caused by the rolling elements 16 passing underneath. Deformation is transferred to the piezoelectric strain sensor 30 which in turn bends and provides a signal proportional to the dynamic deformation.

In the illustrated example, the blind hole 24 of the inner ring, inside which is mounted the piezoelectric strain sensor unit 18, is oriented axially with regard to the axis X-X' of the rolling bearing.

Alternatively, as shown on FIG. 3, in which identical parts are given identical references, the blind hole 24 of the inner ring may be oriented radially with regard to the axis X-X' of the rolling bearing. The blind hole 24 extends radially from the bore of the inner ring.

In the illustrated examples, only one strain sensor unit is mounted on the inner ring 10 to enable measuring rolling elements 16 load. It is also possible to provide one strain sensor unit for each row of rolling elements 14, 16.

As an alternative, it could also be possible to provide a reversed arrangement with the strain sensor unit(s) mounted on the outer ring.

In the described examples, the rolling bearing is provided with two rows of rolling elements. Alternatively, the rolling bearing may comprise only one row of rolling elements or three or more rows of rolling elements. In the illustrated example, the rolling elements are rollers. The rolling bearing may comprise other types of rolling elements, for example needles or balls.

The invention claimed is:

1. A piezoelectric strain sensor unit for inserting into an axially extending hole in an inner ring of a rolling bearing comprising:
   a piezoelectric strain sensor, and
   a sensor holder provided with a main body having a front face that contacts with an axially inner surface of the axially extending hole and a rear face, and with at least two flexible arms mounted on the main body and supporting opposite ends of the piezoelectric strain sensor, the piezoelectric strain sensor being axially located on the side of the rear face of the main body while remaining spaced apart from the rear face, wherein
   the sensor holder is further provided with a central pin that protrudes axially with regard to the front face of the main body and which is axially moveable with regard the main body, the central pin axially abutting onto the piezoelectric strain sensor.

2. The piezoelectric strain sensor unit according to claim 1, wherein a first bending stiffness of the flexible arms of the sensor holder is less than a second bending stiffness of the piezoelectric strain sensor.

3. The piezoelectric strain sensor unit according to claim 1, wherein the central pin axially abuts in the middle of the piezoelectric strain sensor.

4. The piezoelectric strain sensor unit according to claim 1, wherein each flexible arm is provided with an axial part mounted on the main body and flexible in the radial direction, and with a radial part extending the axial part and flexible in the axial direction.

5. The piezoelectric strain sensor unit according to claim 1, wherein the main body, the flexible arms and the central pin of the sensor holder are made into one part.

6. A piezoelectric strain sensor unit for a rolling bearing comprising:
   a piezoelectric strain sensor, and
   a sensor holder provided with a main body having a front face that contacts with a component of the rolling bearing and a rear face, and with at least two flexible arms mounted on the main body and supporting opposite ends of the piezoelectric strain sensor, the piezoelectric strain sensor being axially located on the side of the rear face of the main body while remaining spaced apart from the rear face, wherein
   the sensor holder is further provided with a central pin that protrudes axially with regard to the front face of the main body and which is axially moveable with regard the main body, the central pin axially abutting onto the piezoelectric strain sensor, and
   wherein the front face of the main body is provided with at least three feet to position the sensor holder into contact with the component of the rolling bearing.

7. The piezoelectric strain sensor unit according to claim 6, wherein a first bending stiffness of the flexible arms of the sensor holder is less than a second bending stiffness of the piezoelectric strain sensor.

8. The piezoelectric strain sensor unit according to claim 6, wherein the central pin axially abuts in the middle of the piezoelectric strain sensor.

9. The piezoelectric strain sensor unit according to claim 6, wherein each flexible arm is provided with an axial part mounted on the main body and flexible in the radial direction, and with a radial part extending the axial part and flexible in the axial direction.

10. The piezoelectric strain sensor unit according to claim 6, wherein the main body, the flexible arms and the central pin of the sensor holder are made into one part.

11. A piezoelectric strain sensor unit for a rolling bearing comprising:
    a piezoelectric strain sensor,
    a sensor holder provided with a main body having a front face that contacts with a component of the rolling bearing and a rear face, and with at least two flexible arms mounted on the main body and supporting opposite ends of the piezoelectric strain sensor, the piezoelectric strain sensor being axially located on the side of the rear face of the main body while remaining spaced apart from the rear face, wherein
    the sensor holder is further provided with a central pin that protrudes axially with regard to the front face of the main body and which is axially moveable with regard the main body, the central pin axially abutting onto the piezoelectric strain sensor, and wherein
    an outer shell is secured to the main body of the sensor holder and delimits together with the main body a closed chamber inside which is located a pre-stressing element, the pre-stressing element exerting an axial force on the piezoelectric strain sensor to ensure an axial contact between the strain sensor and the central pin.

12. The piezoelectric strain sensor unit according to claim 11, further comprising a connector sleeve connected to the outer shell and flexible bellows axially interposed between the connector sleeve and the outer shell.

13. The piezoelectric strain sensor unit according to claim 11, wherein a first bending stiffness of the flexible arms of the sensor holder is less than a second bending stiffness of the piezoelectric strain sensor.

14. The piezoelectric strain sensor unit according to claim 11, wherein the central pin axially abuts in the middle of the piezoelectric strain sensor.

15. The piezoelectric strain sensor unit according to claim 11, wherein each flexible arm is provided with an axial part mounted on the main body and flexible in the radial direction, and with a radial part extending the axial part and flexible in the axial direction.

16. The piezoelectric strain sensor unit according to claim 11, wherein the main body, the flexible arms and the central pin of the sensor holder are made into one part.

17. A rolling bearing comprising:
an inner ring,
an outer ring, and
at least one row of rolling elements interposed between raceways of the inner and outer rings, one of the inner and outer rings comprising at least one piezoelectric strain sensor unit including a piezoelectric strain sensor, and
a sensor holder provided with a main body having a front face that contacts with a component of the rolling bearing and a rear face, and with at least two flexible arms mounted on the main body and supporting opposite ends of the piezoelectric strain sensor, the piezoelectric strain sensor being axially located on the side of the rear face of the main body while remaining spaced apart from the rear face, wherein
the sensor holder is further provided with a central pin that protrudes axially with regard to the front face of the main body and which is axially moveable with regard the main body, the central pin axially abutting onto the piezoelectric strain sensor, and wherein
the main body of the sensor holder of the strain sensor unit coming into contact against a flat surface of the ring.

18. The rolling bearing according to claim 17, wherein the inner ring comprises at least one blind hole made into the thickness of the ring, the main body of the sensor holder of the strain sensor unit coming into contact against the flat bottom of the blind hole.

19. The piezoelectric strain sensor unit according to claim 17, wherein a first bending stiffness of the flexible arms of the sensor holder is less than a second bending stiffness of the piezoelectric strain sensor.

20. The piezoelectric strain sensor unit according to claim 17, wherein the central pin axially abuts in the middle of the piezoelectric strain sensor.

* * * * *